Feb. 3, 1942. J. MERNER 2,271,922
RECEPTACLE AND HANDLE THEREFOR
Filed Jan. 16, 1939
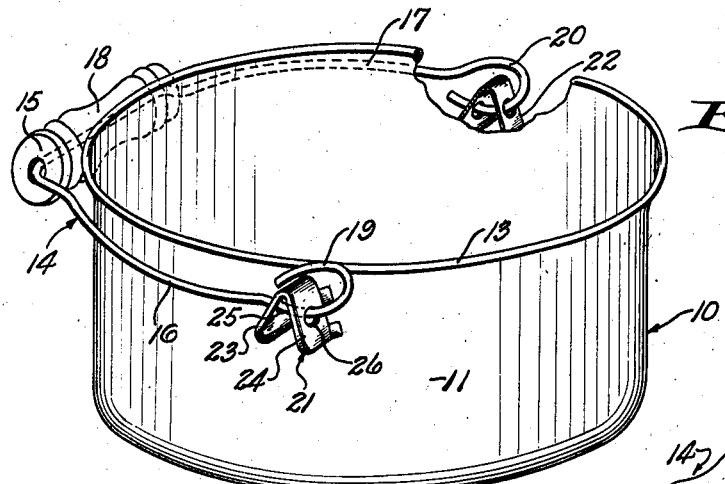
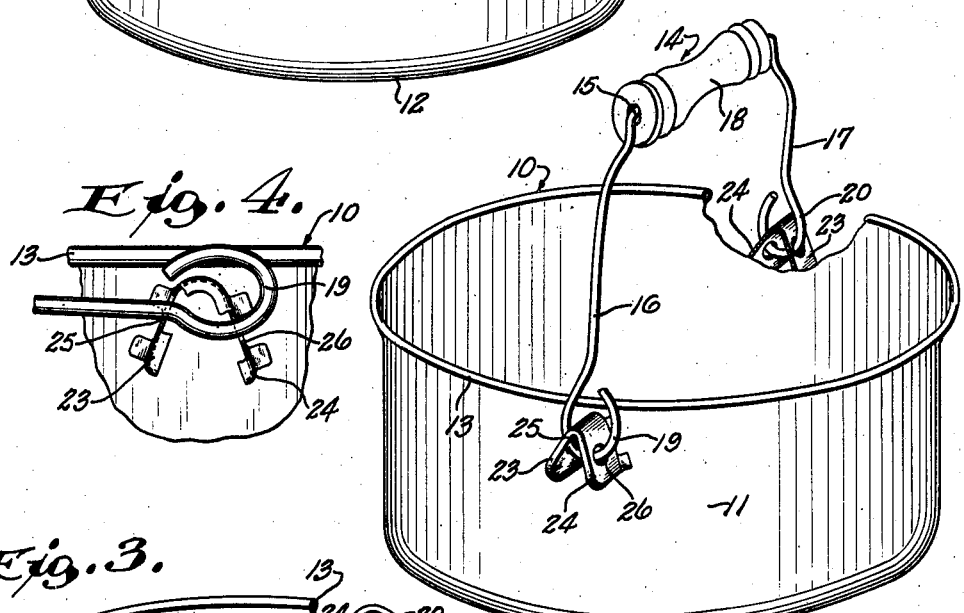
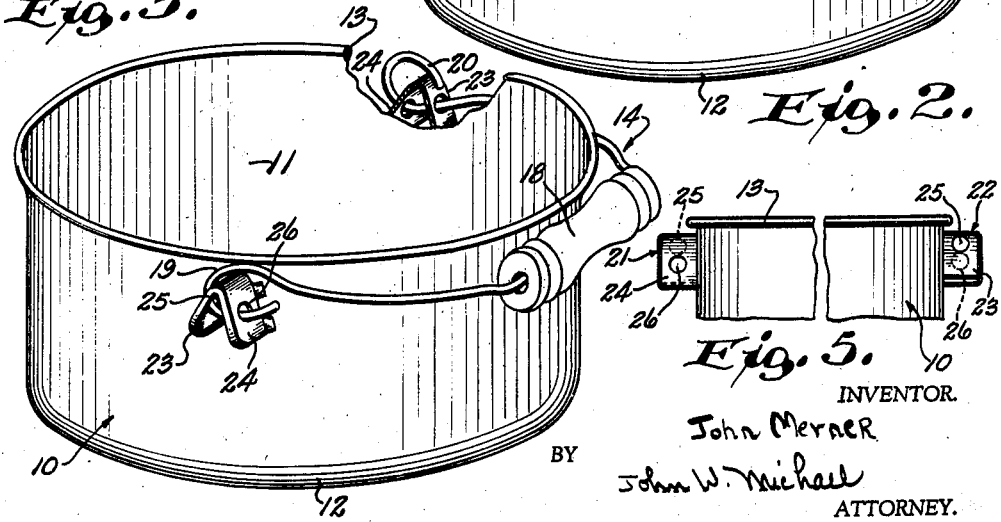
INVENTOR.
John Merner
BY John W. Michael
ATTORNEY.

Patented Feb. 3, 1942

2,271,922

UNITED STATES PATENT OFFICE 2,271,922

RECEPTACLE AND HANDLE THEREFOR

John Merner, Milwaukee, Wis., assignor to Geuder, Paeschke & Frey Co., Milwaukee, Wis., a corporation of Wisconsin Application January 16, 1939, Serial No. 251,152

4 Claims. (Cl. 220—91)

This invention relates to metallic receptacles, especially pails or cooking utensils, and more particularly to a receptacle of the character equipped with a bail-like handle.

One of the objects of the invention is to provide a structure of this character with a special form of interconnection between the legs of the bail and the body portion of the receptacle whereby the bail, although swingably interconnected with the receptacle, will be maintained when swung to either side thereof in a substantially horizontal position with the handle of the bail spaced from the outer wall of the receptacle and disposed closely adjacent the rolled bead around the upper open end thereof.

Another object is to provide a structure of this character and having these advantages and which may also function to releasably secure the bail in upright or vertical position.

A further object of the invention is to provide an interconnection of this character and having these advantages and which is extremely simple in its construction, reliable and effective in its action, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a perspective view showing a pail having a bail-like handle interconnected with the pail in accordance with the present invention and illustrating the bail-like handle disposed to one side of the receptacle, a portion of the receptacle being broken away for the sake of illustration;

Figure 2 is a view similar to Figure 1 but showing the bail-like handle releasably secured in a vertical position;

Figure 3 is a view similar to Figures 1 and 2 but showing the bail-like handle disposed on the opposite side of the receptacle from that in which it is positioned in Figure 1;

Figure 4 is a fragmentary view partly in side elevation and partly in vertical section illustrating the means which interconnects the legs of the bail and the body portion of the receptacle; and Figure 5 is a fragmentary view in end elevation further illustrating this means.

Referring to the drawing, the numeral 10 designates generally a receptacle of the character contemplated by the present invention. The structure of the receptacle may be varied and in the example shown, the receptacle has a cylindrical body portion 11 provided with an integral bottom wall 12 and an open upper end formed with an outwardly rolled bead 13.

The bail-like handle is designated generally at 14 and has a body portion 15 and side legs 16 and 17. A sleeve-like handle or hand grip 18 is rotatably mounted on the body portion of the bail-like handle in the usual way.

The ends of the bail 14, which is formed of suitably heavy wire, are fashioned into eyes 19 and 20 which are interfitted with apertured mounting ears designated generally at 21 and 22 and disposed diametrically opposite portions of the body portion of the receptacle adjacent its upper end. The ears 21 are welded, soldered, pressed, or otherwise secured to the body portion of the receptacle. They are of similar construction and each consists of a piece of sheet metal of inverted V-shape. This particular shape is not essential and may be varied, but it is essential that each ear have peripherally spaced portions 23 and 24 provided with openings or apertures 25 and 26. The apertures 25 and 26 are offset vertically from each other as well as angularly and the offsetting of the apertures on one side is the reverse of that of the ear on the other side. The eyes of the bail-like handle extend through these vertical and reversed offset apertures.

With a structure of this character, when the handle is swung over to one side of the receptacle it may be supported in the position shown in Figure 1 due to the vertical and reverse offsetting of the openings in the mounting ears and it may be similarly supported when swung to the opposite side of the receptacle as illustrated in Figure 3. Furthermore, when brought to an upright or vertical position it will be releasably retained in such position as shown in Figure 2.

The action of the structure in maintaining the bail-like handle in horizontal position on each side of the receptacle is illustrated in Figure 4 where it will be noted that the lower edge of the opening 25 and the upper edge of the opening 26 of one of the ears is the effective support in one position. The corresponding edges of the reversely arranged openings on the other side of the receptacle are the effective support when the position of the handle is reversed.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A metallic receptacle comprising a body portion having diametrically opposite mounting ears, each ear having peripherally spaced portions the plane of which is substantially perpendicular to the side of said receptacle, an aperture in each of said portions, the apertures in the portions comprising one ear being vertically offset with respect to each other, the apertures in the portions comprising the other ear being vertically offset with respect to each other in symmetrically reverse order to those of the first ear, and a bail having eyes at each end thereof, each of said eyes loosely interfitting with both apertures in a respective mounting ear.

2. A metallic receptacle comprising a body portion having diametrically opposite mounting ears, each ear having peripherally spaced portions the plane of which is substantially perpendicular to the side of said receptacle, an aperture in each of said portions, the apertures in the portions comprising one ear being vertically offset with respect to each other, the apertures in the portions comprising the other ear being vertically offset with respect to each other in symmetrically reverse order to those of the first ear, a bail having oval-shaped eyes formed in the ends thereof by turning each end back upon itself, one end being turned in one direction and the other end being turned in the other direction, said eyes being inserted in the apertures comprising an ear in such fashion that the end portion of each eye protrudes outwardly from the lower of the apertures of said ears.

3. A metallic receptacle having mounting ears and a bail swingably connected therewith, means for maintaining said bail in an upright position or in a substantially horizontal position to either side of said receptacle when said receptacle is positioned in upright manner comprising oval-shaped eyes formed on the ends of said bail by bending the ends of the bail back upon itself, the eye at one end being reversibly bent from the eye at the other end, the plane of each eye being substantially parallel to the side of said receptacle, and peripherally spaced relatively sloping portions forming said ears, an aperture in each of said portions, the apertures in the portions comprising one ear being vertically offset with respect to each other, the apertures in the portions comprising the other ear being vertically offset with respect to each other in symmetrically reverse order to those of the first ear, the bottoms of the apertures in the portions comprising an ear being spaced more than the tops thereof whereby the bottoms engage the outside of said oval-shaped eyes to maintain said bail in upright position while the tops engage the inside of said oval-shaped eyes to permit the bail to readily swing about the receptacle, the bottom of the upper aperture of each ear adapted to engage the bail at the point of forming of the eyes thereon and the top of the lower eye of each ear adapted to engage the inside of said oval-shaped eyes to maintain said bail in substantially horizontal position.

4. A receptacle having a pair of mounting ears one of which comprises peripherally spaced portions, the planes of which are substantially normal to the side of said receptacle and which slope upwardly toward each other, an aperture in each of said portions, and a bail having an oval-shaped eye interfitted with each aperture, said apertures being so positioned that when said bail is in vertical position the bottoms of said apertures will engage the opposite outer sides of said eye at points sufficiently spaced from the bottom thereof to releasably maintain said bail in such position, said bail also having a loosely interfitting connection with the other of said ears.

JOHN MERNER.